US008607737B2

(12) United States Patent
Forbes

(10) Patent No.: US 8,607,737 B2
(45) Date of Patent: Dec. 17, 2013

(54) WATERING FOUNTAIN

(75) Inventor: Alden O. Forbes, Branson, MO (US)

(73) Assignee: David G. Anderson, Plain City, UT (US)

(*) Notice: Subject to any disclaimer, the term of this patent is extended or adjusted under 35 U.S.C. 154(b) by 179 days.

(21) Appl. No.: 13/334,925

(22) Filed: Dec. 22, 2011

(65) Prior Publication Data

US 2013/0160714 A1    Jun. 27, 2013

(51) Int. Cl.
*A01G 7/06* (2006.01)
(52) U.S. Cl.
USPC .............................................. 119/75; 119/73
(58) Field of Classification Search
USPC ................................................. 119/73–75, 81
See application file for complete search history.

(56) References Cited

U.S. PATENT DOCUMENTS

| | | | | |
|---|---|---|---|---|
| 1,986,928 A * | 1/1935 | Hanson | ............................ | 119/75 |
| 3,563,207 A * | 2/1971 | Kofford | ........................... | 119/75 |
| 3,648,663 A * | 3/1972 | Kofford | ........................... | 119/75 |
| 3,823,692 A | 7/1974 | Bowser | | |
| 3,831,558 A * | 8/1974 | Forbes | ............................ | 119/73 |
| 3,851,558 A | 12/1974 | Hopkins | | |
| 4,307,682 A * | 12/1981 | Bollman | ......................... | 119/75 |
| 4,444,149 A * | 4/1984 | Shomer | ......................... | 119/476 |
| 4,450,789 A * | 5/1984 | Nilsen et al. | ................... | 119/477 |
| 4,813,378 A * | 3/1989 | Lapp | ............................... | 119/73 |
| 6,279,508 B1 | 8/2001 | Marchant et al. | | |
| 7,549,395 B2 * | 6/2009 | Stenberg | ........................ | 119/74 |

* cited by examiner

*Primary Examiner* — Kristen C Hayes
(74) *Attorney, Agent, or Firm* — JP Webb; Jason P. Webb; Danny Y. H. Cheng

(57) ABSTRACT

A watering fountain having a first valve assembly coupled to a pressurized water supply, including a check valve configured to restrict water flow under pressurized water conditions. The fountain includes a second valve assembly selectably coupleable to the first valve assembly and including a disabling structure, a valve, a drain port, a flexible diaphragm, a diaphragm actuator, and a quick connect valve. The watering fountain also includes a fluid conduit extending upwardly from the second valve assembly. The fountain includes an activator rod extending upwardly from the second valve assembly inside the fluid conduit. The watering fountain includes a basin extending upwardly from the fluid conduit. The fountain includes an activator plate operationally coupled to the activator rod and disposed within the basin.

15 Claims, 6 Drawing Sheets

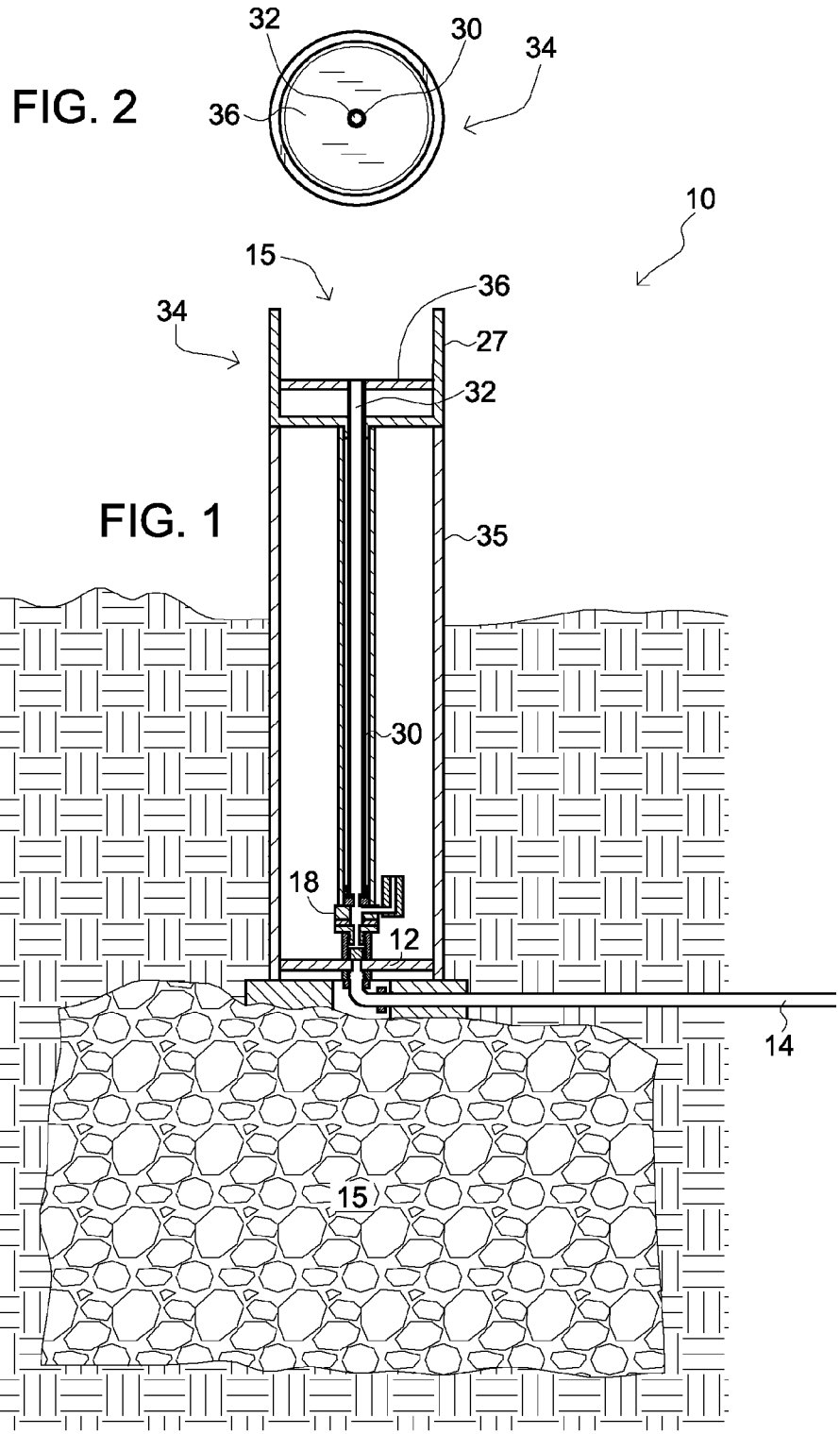

WATERING FOUNTAIN

BACKGROUND OF THE INVENTION

1. Field of the Invention

The present invention relates to watering devices, specifically to an animal drinking fountain.

2. Description of the Related Art

Customarily, drinking water is supplied for horses and other domestic animals in a trough or similar receptacle which is filled periodically. Although such a device represents the ultimate in simplicity, it is attended by several disadvantages foremost of which is the freezing of the water. Another disadvantage is the necessity to maintain a substantial quantity of water in the trough which tends to become dirty and polluted. Some improvements have been made in the field, including but not limited to the development of drinking fountains, some of which have been adapted for use with animals.

A fountain (from the Latin "fons" or "fontis", a source or spring) is a piece of architecture which pours water into a basin or jets it into the air either to supply drinking water or for decorative or dramatic effect. Fountains were originally purely functional, connected to springs or aqueducts and used to provide drinking water and water for bathing and washing to the residents of cities, towns and villages. Until the late 19th century most fountains operated by gravity, and needed a source of water higher than the fountain, such as a reservoir or aqueduct, to make the water flow or jet into the air. A water fountain or drinking fountain is designed to provide drinking water and has a basin arrangement with either continuously running water or a tap. The drinker bends down to the stream of water and swallows water directly from the stream. Modern indoor drinking fountains may incorporate filters to remove impurities from the water and chillers to reduce its temperature. In some regional dialects, water fountains are called bubblers. Water fountains for human use are usually found in public places, like schools, rest areas, libraries, and grocery stores. Water fountains for animals generally include a basin and some means for dispensing water therein such that an animal may be automatically provided water as needed. Examples of references related to the present invention are described below in their own words, and the supporting teachings of each reference are incorporated by reference herein:

U.S. Pat. No.: 1,228,224, issued to Luke et al., discloses a drinking fountain and has for its object the production of a simple and efficient drinking fountain, especially adapted to be used by stock and the like, whereby the fountain will be automatically turned on to supply water therefor when an animal pushes the inner bowl downwardly for opening the water supply.

U.S. Pat. No.: 2,469,946, issued to Bremer, discloses a stock watering bowl of the class described providing for a more efficient control of water to the bowl, and which is regulatable to adapting the device to varying conditions and types of animals.

U.S. Pat. No.: 3,547,083, issued to Peterson, discloses a well pimp and trough constructed and arranged with an operator connected to a lift pump which can be engaged directly by the animals to lift the pump and raise water to the trough.

U.S. Pat. No.: 3,823,692, issued to Bowser, discloses a livestock watering fountain wherein a watering bowl or basin is provided with an adjustable water level control valve which, in turn, is connected to a controllable water source. A drain is provided in the bottom of the bowl for periodic cleaning. The watering bowl is characterized by a removable horizontal false bottom. The watering fountain is particularly adaptable to use with race horses. The false bottom prevents an overheated horse from swallowing more than a predetermined amount of water. The horse can drink no lower in the bowl than the level of the false bottom when the main water supply is turned off, thereby preventing the horse from foundering.

U.S. Pat. No.: 4,813,378, issued to Lapp, discloses an animal activated watering fountain in which intake and shut-off valves are located below the frost line to allow for year round use. That is, the fountain is not subject to freezing. The fountain is characterized by a hydrant or drain-back valve which can be activated to maintain the level of the water either below such frost line, i.e. freezing weather, or at the top of the water feed line, i.e. milder weather.

U.S. Pat. No.: 6,279,508, issued to Marchant et al., discloses a pet watering fountain including a box-shaped housing, a water supplyer, a hose, two pipes, a control valve unit (body), a helical or expansion spring (spring), a bowl, a drain, and a pedal. A thirsty dog walks onto the spring-biased pedal. The spring-biased pedal is then lowered to the floor of the housing which actuates a lever on the control valve unit. As a result, water flows from an outside hose bib into a garden hose, through a first pipe into a valve unit, then into a second pipe which fills into an elevated bowl.

The inventions heretofore known suffer from a number of disadvantages which include being limited in use, being difficult to set up, being difficult to maintain, being difficult to repair, being harmful to the animals, being bulky, being inefficient, being unreliable, being likely to clog, requiring too many parts, being likely to be broken by use by animals, not handling inclement weather well, and/or failing to properly drain.

What is needed is a water fountain that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available animal watering fountains. Accordingly, the present invention has been developed to provide an efficient and effective animal watering fountain.

According to one embodiment of the invention, there is a watering fountain that may have a first valve assembly. The first valve assembly may be coupled to a pressurized water supply and may include a check valve. The check valve may be configured to restrict water flow under pressurized water conditions. The watering fountain may include a second valve assembly that may be selectably coupleable to the first valve assembly.

The second valve assembly may include a disabling structure that may be shaped and positioned such that when the second valve assembly is coupled to the first valve assembly, the disabling structure may disable the check valve of the first valve assembly, thereby permitting fluid to flow therethrough, under pressurized water conditions. The second valve assembly may include a valve that may be configured to bilaterally restrict fluid flow in a first mode, and may permit fluid flow in a second mode. The second valve assembly may include a drain port that may be disposed above a diaphragm valve and may be configured to permit fluid to drain therefrom. The second valve assembly may include a flexible diaphragm that may be disposed within the valve and may be configured to restrict or release fluid there through. The second valve assembly may include a diaphragm actuator that may be disposed within the second valve and may be configured to actuate the flexible diaphragm to restrict and release fluid there through. The second valve assembly may include a stabilizing adapter that may be coupled to the fluid conduit and may be configured to stabilize and quickly disconnect the fluid conduit therefrom.

The watering fountain may include a fluid conduit that may extend upwardly from the second valve assembly. The watering fountain may include an activator rod that may extend upwardly from the second valve assembly inside the fluid conduit and may be operationally coupled to the valve. The watering fountain may include a basin that may extend upwardly from the fluid conduit and may be in fluid communication therewith. The watering fountain may include an activator plate that may be operationally coupled to the activator rod and may be disposed within the basin. The displacement of the activator plate may release fluid to the basin. The activator plate may be substantially circular. The activator plate may be disposed within the basin and may be configured to rest perpendicularly to a side wall of the basin.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 1 is a side cross-sectional view of a watering fountain in situ, according to one embodiment of the invention;

FIG. 2 is a top plan view of a basin of a watering fountain, according to one embodiment of the invention;

DETAILED DESCRIPTION OF THE INVENTION

Figure 3:
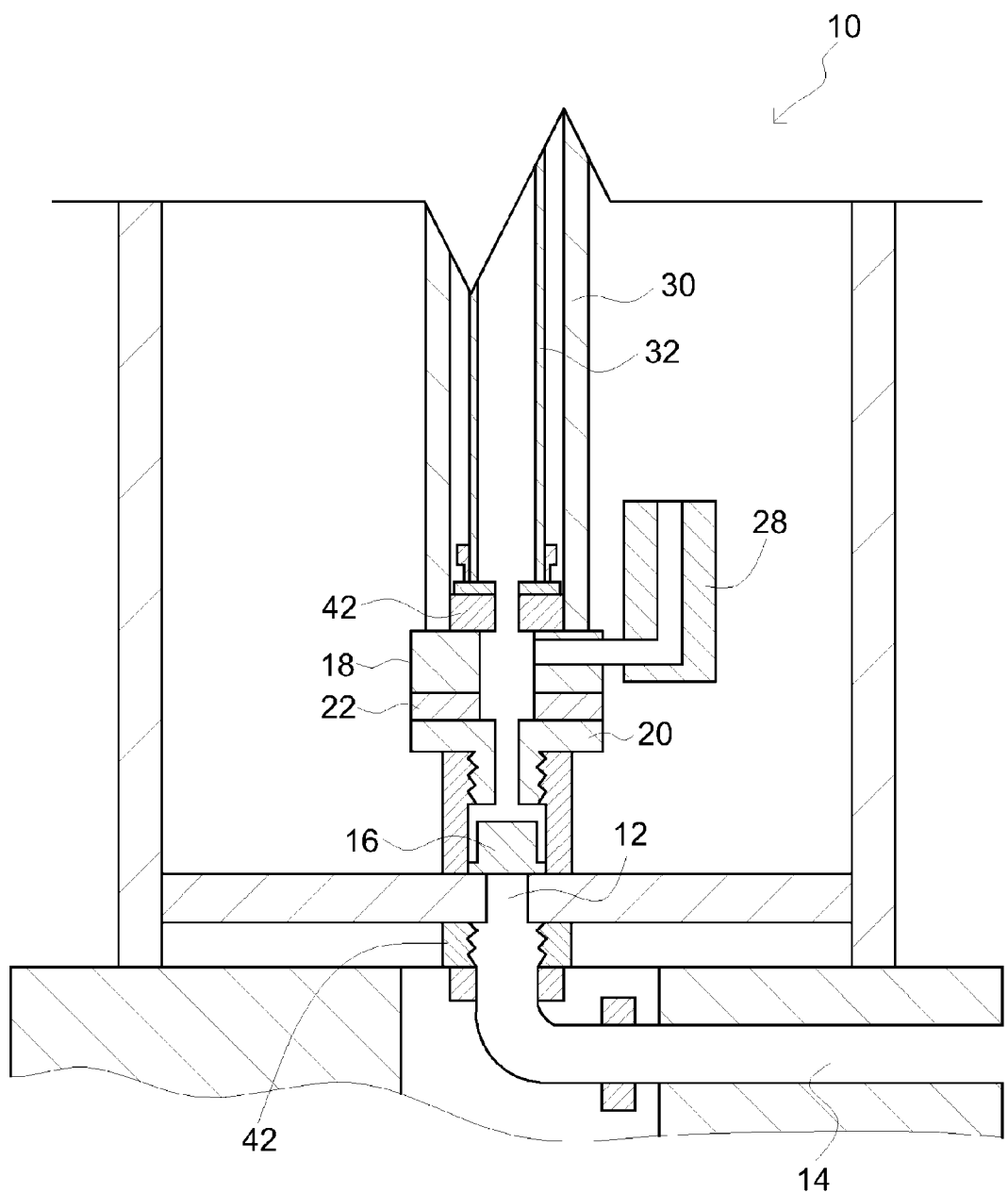
FIG. 3 is a partial side-cross sectional view of a watering fountain showing a first valve assembly coupled to a second valve assembly, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a side cross-sectional view of a watering fountain, according to one embodiment of the invention. There is shown a watering fountain 10 including a first valve assembly 12 disposed underground, coupled to a pressurized water supply 14 and selectably coupled to a second valve assembly 18, the second valve assembly 18 is coupled to an activator rod 32 functionally coupled to an activator plate 36 of a basin 34 such that movement of the activator rod 32 opens the valve and dispenses water, all disposed within a housing 35. Accordingly, an animal may press on the activator plate 36 with the face or muzzle, thereby depressing the activator rod 32 that is functionally coupled to the second valve assembly 18, thereby dispensing water into the basin 34 for the benefit of the animal. Further, during maintenance, the second valve assembly 18 may be disconnected from the first valve assembly 12 and the entire unit, minus the first valve assembly 12, may be brought out of the ground for service and/or replacement when needed, while the first valve assembly 12 prevents pressurized fluid from being continually released during such.

The illustrated watering fountain 10 is configured to provide access to water for animals in locations that may be remote, rural, or otherwise. The watering fountain 10 is configured to be set into the ground and to couple to an underground supply of pressurized water, thereby protecting the water-supply from freezing temperatures during times when the ambient temperature is below freezing. The watering fountain includes a housing 35 configured to be disposed in the ground near a pressurized water supply 14.

The housing may be a hollow or cylindrical member having walls configured to protect the contents of the housing and/or to provide a decorative effect. The watering fountain 10 is disposed at least partially within the ground, generally about half way up on the housing 35, ideally placing the bottom-most portion of the fountain below an effective freeze line in the ground. The illustrated watering fountain 10 is disposed above a gravel drain field 15 configured to drain water drained out from the watering fountain 10 and including a body of gravel set into the ground under the water fountain such that water draining from the water fountain may run through and collect within the gravel as it is absorbed into the surrounding earth.

The illustrated first valve assembly 12 is coupled to a pressurized water supply 14 and is configured to restrict water flow under pressurized conditions. The watering fountain 10 includes a second valve assembly 18 selectably coupleable to the first valve assembly 12. The second valve assembly 18 is configured to rest above the first valve assembly 12 and selectably couple thereto. The second valve assembly 18 is configured permit fluid flow through the first valve assembly 12 during pressurized conditions.

The illustrated watering fountain 10 includes a fluid conduit 30 extending upwardly from the second valve assembly 18. The fluid conduit 30 is configured to transport water from the second valve assembly 18 to a basin 34. The watering fountain 10 includes an activator rod 32 extending upwardly from the second valve assembly 18 disposed inside the fluid conduit 30 and operationally coupled to the second valve 18. The activator rod 32 is configured to extend through the second valve assembly to activate the first valve assembly to release water therethrough.

The illustrated watering fountain 10 includes a basin 34 configured to extend upwardly from the fluid conduit 30 and be in fluid communication therewith. The basin 34 is configured to support water flowing up through the fluid conduit 30 for an animal to drink therefrom. The watering fountain 10 includes an activator plate 36 operationally coupled to the activator rod 32 and disposed within the basin 34. The displacement of the activator plate 36, such as downward pressure being applied to an exterior side of the activator plate 36 by an animal, releases fluid to the basin 34. The activator plate 36 is disposed within the basin 34 and configured to rest perpendicularly to a side wall 27 of the basin 34.

In operation of one embodiment of the invention, a user disposes a watering fountain housing into the ground above a gravel drain field and around a pressurized water supply. The user couples the pressurized water supply to a first valve assembly of the watering fountain. The user attaches the second valve assembly to the first valve assembly and then attaches an activator rod to the second valve assembly. The user couples a fluid conduit over the activator rod and couples an activator plate to the activator rod. The watering fountain is ready for use, an animal approaches the watering fountain and applies pressure to the activator plate. The activator plate displaces the activator rod, thereby releasing water through the first valve assembly, through the second valve assembly, and up through the fluid conduit up to a basin, wherein the animal drinks therefrom.

FIG. 2 is a top plan view of a watering fountain, according to one embodiment of the invention. There is shown a basin 34 of a watering fountain.

The illustrated basin 34 is in fluid communication with a fluid conduit 30. The fluid conduit 30 includes an activator rod 32 extending upwardly from inside of the fluid conduit 30. The activator rod 32 is configured to activate and release fluid through the fluid conduit, up to the basin 34, wherein an animal may drink therefrom. The activator rod 32 is operationally coupled to an activator plate 36 disposed within the basin 34. The illustrated activator plate 36 is substantially circular and configured to rest about a base of the basin 34. The activator plate 36 is configured to support water thereon for an animal to drink therefrom. The activator plate 36 is disposed within the basin and is configured to rest perpendicularly to a side wall of the basin 34.

FIG. 3 is a side-cross sectional view of a first valve assembly coupled to a second valve assembly of a watering fountain, according to one embodiment of the invention. There is shown a first valve 12 coupled to a second valve 18 of a watering fountain 10.

The illustrated watering fountain 10 includes a first valve assembly 12. The first valve assembly 12 is coupled to a pressurized water supply 14. The illustrated first valve assembly 18 is coupled to a quick connect valve 42 configured to couple the first valve assembly 18 to the pressurized water supply 14. The quick connect valve 42 is configured to quickly disconnect the pressurized water supply 14 from the first valve assembly 12 during repair or maintenance. The first valve assembly 12 includes a check valve 16. The check valve 16 is configured to restrict water flow through the first valve 12 under pressurized water conditions from the pressurized water supply 14. The watering fountain 10 includes a second valve assembly 18 selectably coupleable to the first valve assembly 12. The illustrated second valve assembly 18 is disposed above the first valve assembly and is in fluid communication therewith.

The illustrated second valve assembly 18 includes a disabling structure 20 shaped and positioned such that when the second valve assembly 18 is coupled to the first valve assembly 12, the disabling structure 20 disables the check valve 16 of the first valve assembly 12, thereby permitting fluid to flow therethrough, under pressurized water conditions from the pressurized water supply 14. The second valve assembly 18 includes a diaphragm valve 22 configured to bilaterally restrict fluid flow in a first mode, and permit fluid flow in a second mode. The second valve assembly 18 includes a drain port 28 disposed above the diaphragm valve 22 and configured to permit fluid to drain therefrom. The second valve assembly 18 includes a quick connect valve 42 configured to couple the second valve assembly 18 to a fluid conduit 30. The quick connect valve 42 is configured to quickly disconnect the fluid conduit 30 from the second valve assembly 18 during repair or maintenance. A non-limiting example of disabling structures include valves that operate in an opened mode when couplings are coupled together and that automatically shift to a closed mode when the couplings are separated. Such automatic response may be effectuated by structures such as but not limited to pressure fittings, springs/bias members, oversized members that displace other portions when connected, free floating butterfly valves with one-way stops, ball-check valves, backwater valves, diaphragm check valves, swing check valves, tilting disc check valves, stop-check valves, lift-check valves, duckbill valves, and the like and combinations thereof.

The illustrated watering fountain 10 includes a fluid conduit 30 extending upwardly from the second valve assembly 18 and configured to be in fluid communication therewith. The watering fountain 10 includes an activator rod 32 extending upwardly from the second valve assembly 18 and disposed within the fluid conduit 30 and operationally coupled to the second valve assembly 18. The activator rod 32 is configured to activate the release of fluid from the pressurized water supply 14 through the first valve assembly 18, and through the second valve assembly 18, and up through the fluid conduit 30 to a basin of the watering fountain 10.

Figure 4:
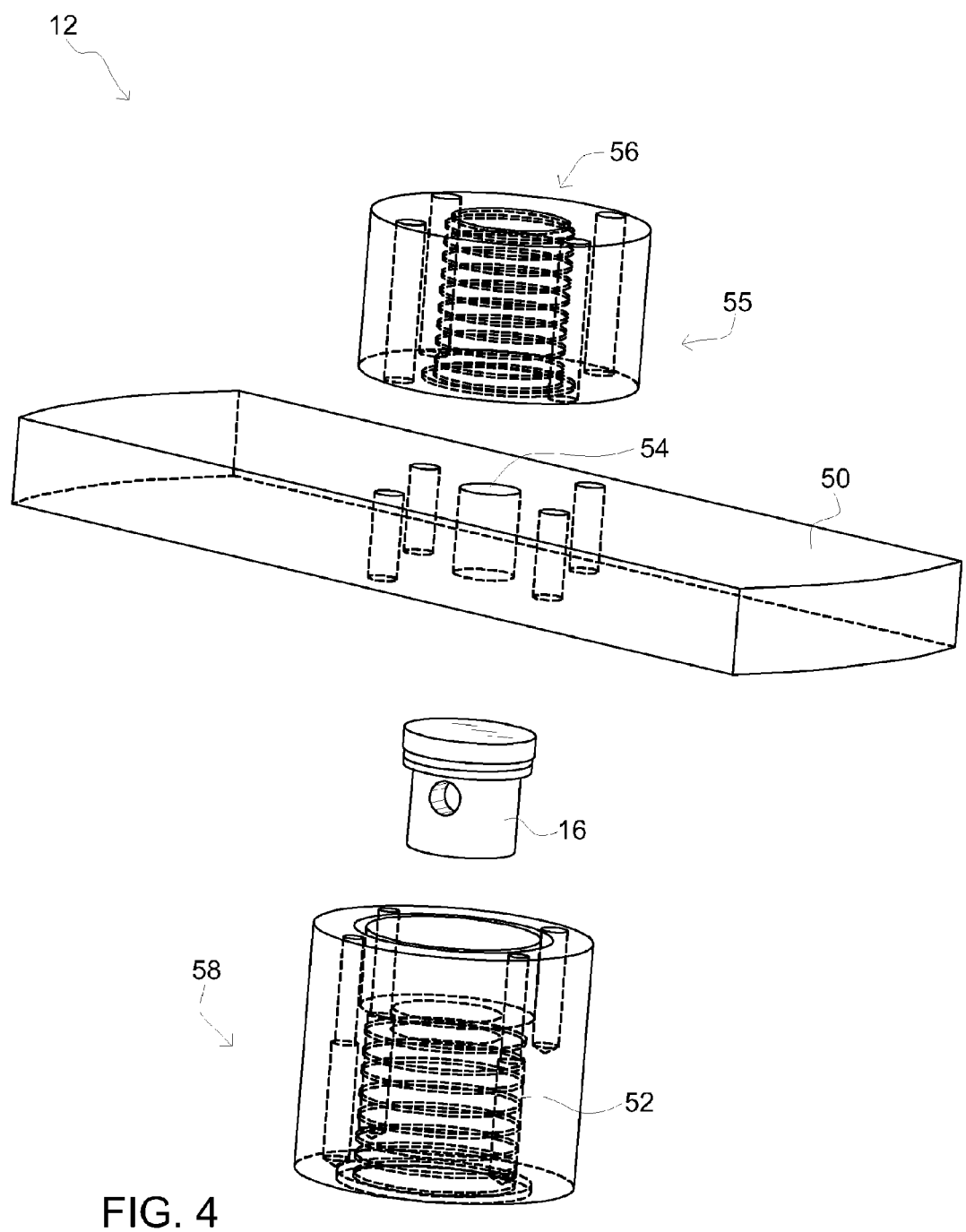
FIG. 4 is an exploded perspective view of a first valve assembly of a watering fountain, according to one embodiment of the invention.

FIG. 4 is a perspective cross-sectional view of a first valve assembly of a watering fountain, according to one embodiment of the invention. There is shown a first valve assembly 12 including a lower valve member 58 having a check valve 16 operationally disposed therein, a foot support member 50, and an upper valve member 55.

The illustrated first valve assembly 12 includes a lower valve member 58 configured to couple to a pressurized water supply or to a quick connect valve and then to a pressurized water supply. The lower valve member 58 includes a biased member 52 disposed within the lower valve member 58. The biased member 52 is in communication with a check valve 16 of the first valve assembly 12. The check valve 16 is configured to rest within the lower valve member 58 and positioned above the biased member 52. The check valve 16 is configured to restrict water flow, under pressurized water conditions, through the first valve assembly 12.

The first valve assembly 12 includes a foot support member 50 configured to couple to the lower valve member 58. The foot support member 50 is configured to rest above the lower valve member 58. The foot support member 50 is configured to support and stabilize the first valve assembly 12 within a watering fountain. The foot support member 50 is configured to span the interior width of a housing of the watering fountain. The foot support member 50 includes a top aperture 54 configured to provide an opening to access or activate the check valve 16. The first valve assembly 12 includes an upper valve member 55 configured to permit fluid to flow therethrough. The upper valve member 55 is configured to rest above the foot support member 50 and couple thereto. The upper valve member 55 includes a biased member 56 disposed therein and configured to couple to a disabling structure of a second valve assembly.

Figure 5:
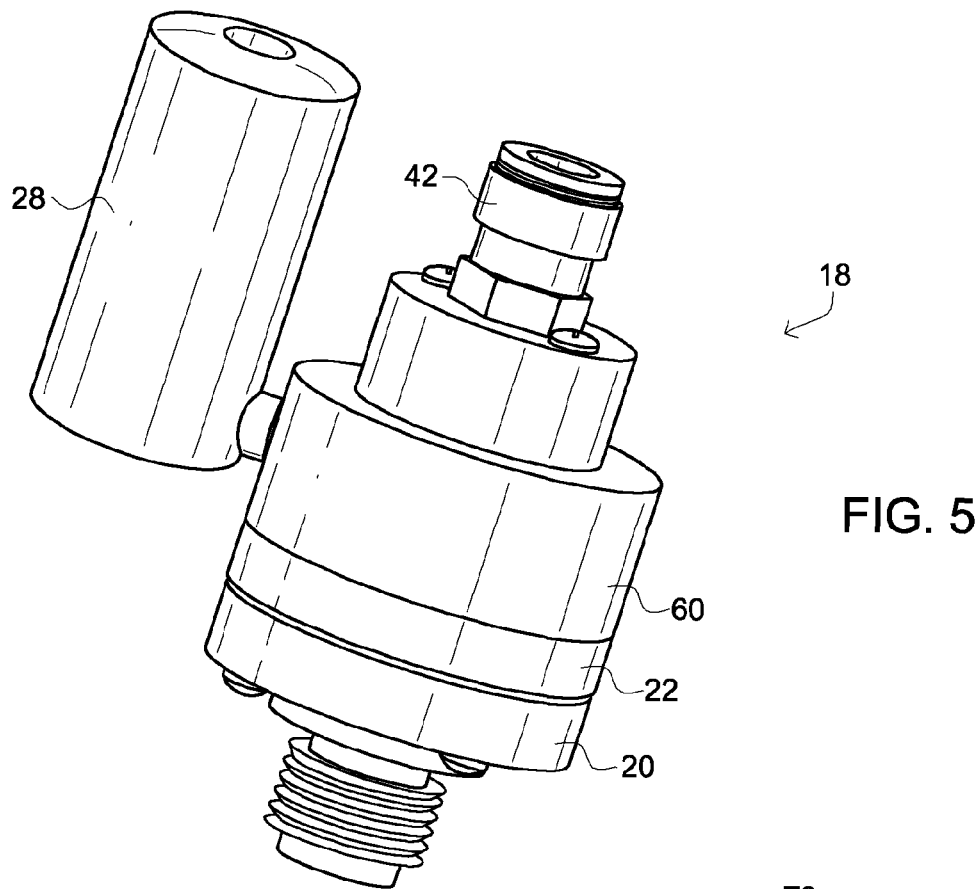
FIG. 5 is a perspective view of a second valve assembly of a watering fountain, according to one embodiment of the invention.

FIG. 5 is a perspective view of a second valve assembly of a watering fountain, according to one embodiment of the invention. There is shown a second valve assembly 18 including a disabling structure 20, a diaphragm valve 22, a stabilizing valve 60, and a drain port 28.

The illustrated second valve assembly 18 is configured to selectably couple to a first valve assembly of a watering fountain. The second valve assembly 18 is configured to rest above a first valve assembly and permit fluid flow therethrough. The second valve assembly 18 includes a disabling structure 20 shaped and positioned such that when the second valve assembly 18 is coupled to the first valve assembly, the disabling structure 20 disables a check valve of the first valve assembly, thereby permitting fluid to flow therethrough, under pressurized water conditions. The disabling structure 20 is configured to couple to an upper valve member of a first valve assembly.

The second valve assembly 18 includes a diaphragm valve 22 configured to bilaterally restrict fluid flow in a first mode, and permit fluid flow in a second mode. The diaphragm valve 22 is configured to support a flexible diaphragm therein. The second valve assembly 18 includes a stabilizing adapter 60 disposed above the diaphragm valve 22. The stabilizing adapter 60 is configured to couple a drain port to the second valve assembly 18 and be in fluid communication therewith. The drain port 28 is disposed above the diaphragm valve 22 and is in fluid communication with a fluid conduit. The drain port 28 is configured to permit fluid to drain from the fluid conduit. Undrawn water from a basin travels back down the fluid conduit and is released out the drain port, into a gravel drain field. The second valve assembly 18 includes a quick connect valve 42 configured to couple to a fluid conduit and configured to quickly disconnect the fluid conduit from the second valve assembly 18.

Figure 6:
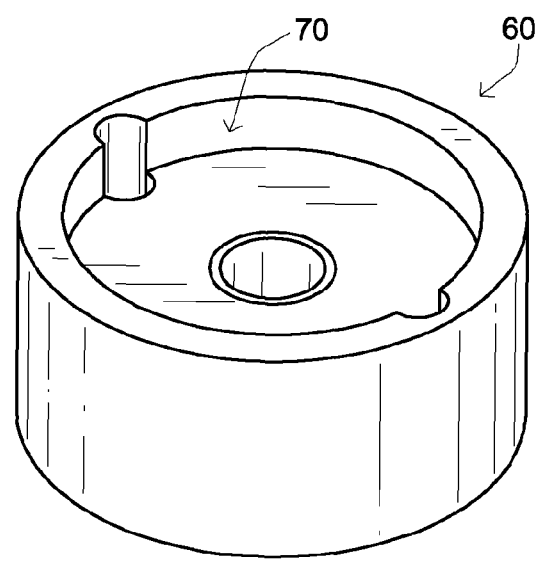
FIG. 6 is a perspective view of a stabilizing adapter of a watering fountain, according to one embodiment of the invention.

FIG. 6 is a stabilizing adapter of a watering fountain, according to one embodiment of the invention. There is shown a stabilizing adapter 60 of a second valve assembly of a watering fountain.

The illustrated stabilizing adapter 60 is configured to permit fluid to flow up through a fluid conduit to a basin of the watering fountain and also permit fluid to back flow therethrough to the drain port, to drain excess water therefrom. The stabilizing adapter 60 includes a reservoir 70 configured to disperse water to a drain port and also to permit water to travel therethrough to a fluid conduit.

Figure 7:
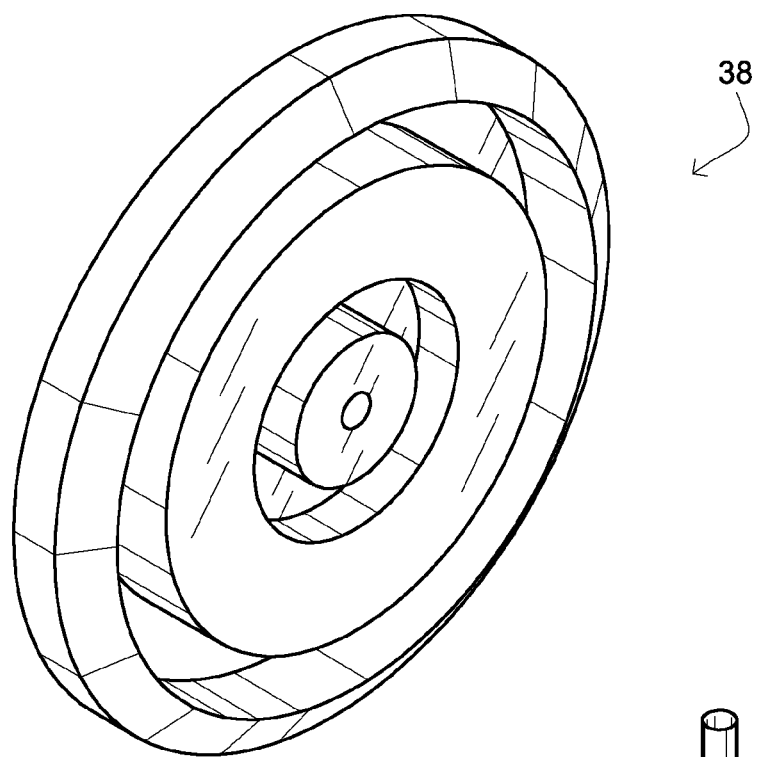
FIG. 7 is a perspective view of a flexible diaphragm of a second valve assembly of a watering fountain, according to one embodiment of the invention.

FIG. 7 is a perspective view of a flexible diaphragm of a second valve assembly of a watering fountain, according to one embodiment of the invention. There is shown flexible diaphragm 38 of a second valve assembly of a watering fountain.

The second valve assembly includes a flexible diaphragm 38. The illustrated flexible diaphragm is disposed within a diaphragm valve of the second valve assembly. The flexible diaphragm 38 is configured to restrict or release fluid through the second valve assembly. The flexible diaphragm 38 is configured to plug an aperture that is disposed through the second valve assembly. The flexible diaphragm 38 is configured to flex bilaterally, thereby either permitting or restricting water to flow therethrough.

Figure 8:
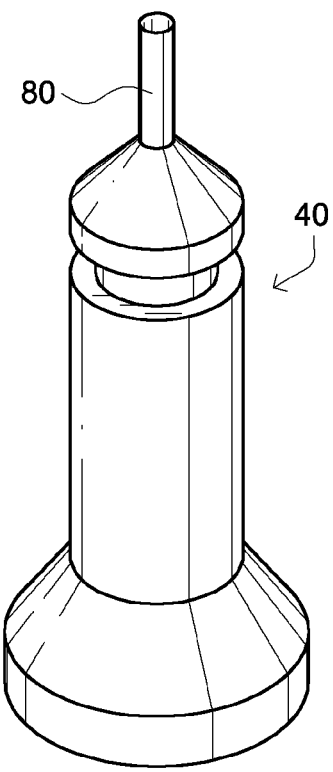
FIG. 8 is a perspective view of a diaphragm actuator of a second valve assembly of a watering fountain, according to one embodiment of the invention.

FIG. 8 is a perspective view of a diaphragm actuator of a second valve assembly of a watering fountain, according to one embodiment of the invention. There is shown a diaphragm actuator 40 of a second valve assembly of a watering fountain.

The second valve assembly includes a diaphragm actuator 40 disposed within the second valve assembly and configured to actuate a flexible diaphragm to restrict or release fluid therethrough. The diaphragm actuator 40 includes an actuation member 80 configured to be disposed through an aperture of the flexible diaphragm. The diaphragm actuator 40 is in communication with an activator rod of the watering fountain. The activator rod is configured to displace the diaphragm actuator 40, thereby allowing water to release through the flexible diaphragm and up through a fluid conduit of the watering fountain.

Figure 9:
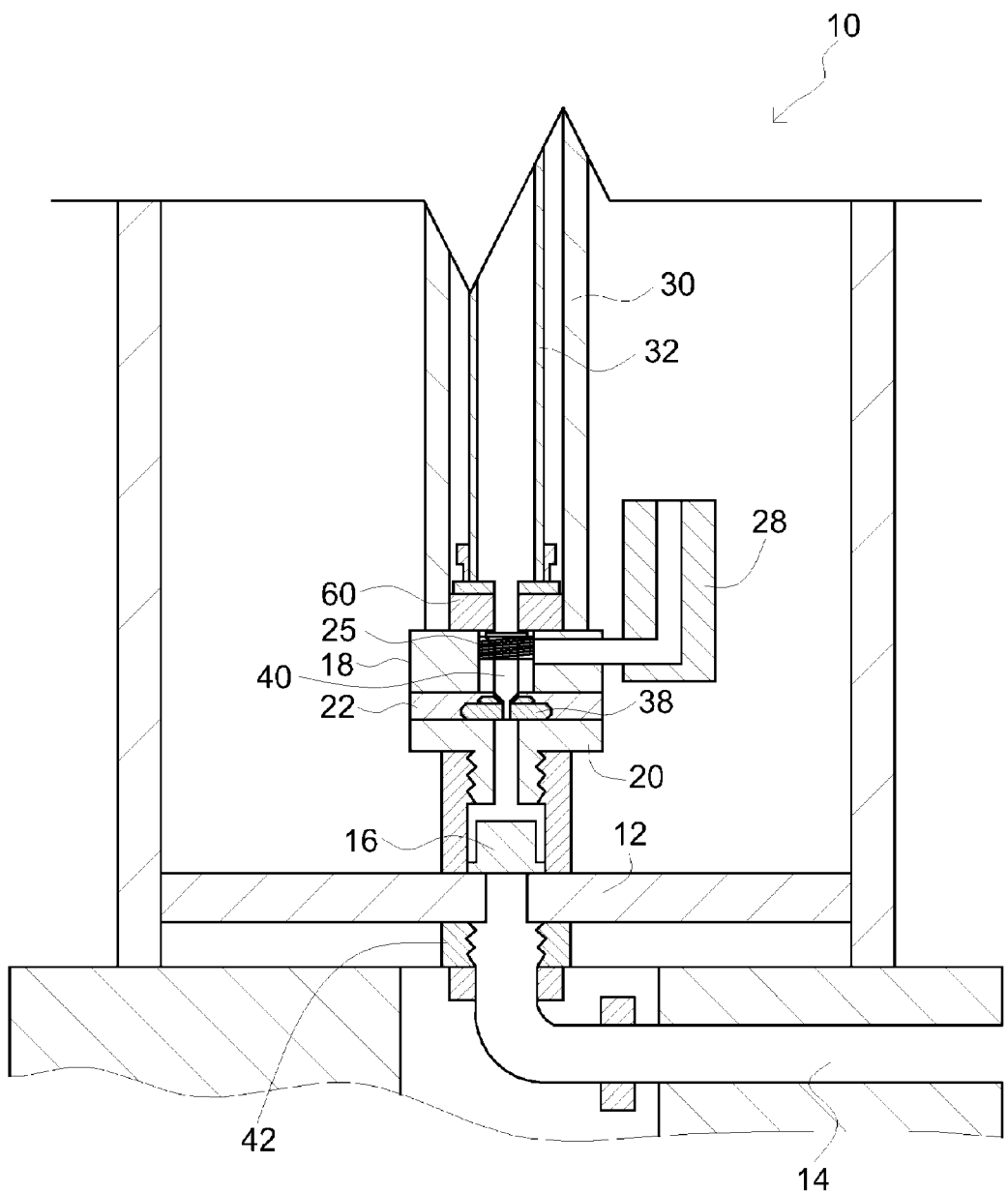
FIG. 9 is a cross-sectional view of a first valve assembly coupled to a second valve assembly, according to one embodiment of the invention.

FIG. 9 is a cross-sectional view a first valve assembly coupled to a second valve assembly, according to one embodiment of the invention. There is shown a first valve 12 coupled to a second valve 18 of a watering fountain 10.

The illustrated watering fountain 10 is configured to be disposed within the ground, in a remote location, to provide a water source to livestock. The watering fountain 10 includes a first valve assembly 12 coupled to a pressurized water supply 14 disposed within the ground. The illustrated first valve assembly 18 is coupled to a quick connect valve 42 configured to couple the first valve assembly 18 to the pressurized water supply 14. The quick connect valve 42 is configured to quickly disconnect the pressurized water supply 14 from the first valve assembly 12 during repair or maintenance. The first valve assembly 12 includes a check valve 16. The check valve 16 is configured to restrict water flow through the first valve 12 under pressurized water conditions from the pressurized water supply 14.

The watering fountain 10 includes a second valve assembly 18 selectably coupleable to the first valve assembly 12. The illustrated second valve assembly 18 is disposed above the first valve assembly 12 and is in fluid communication therewith. The second valve assembly 18 includes a disabling structure 20 shaped and positioned such that when the second valve assembly 18 is coupled to the first valve assembly 12, the disabling structure 20 disables the check valve 16 of the first valve assembly 12, thereby permitting fluid to flow therethrough, under pressurized water conditions from the pressurized water supply 14. The second valve assembly 18 includes a diaphragm valve 22 configured to bilaterally restrict fluid flow in a first mode, and permit fluid flow in a second mode. The second valve assembly 18 includes a drain port 28 disposed above the diaphragm valve 22 and extending out a side wall of the second valve assembly 18. The drain port 28 is configured to permit fluid to drain therefrom. The second valve assembly 18 includes a stabilizing adapter 60 configured to couple the second valve assembly 18 to a fluid conduit 30. The stabilizing adapter 60 is configured to quickly disconnect the fluid conduit 30 from the second valve assembly 18 during repair or maintenance.

The watering fountain 10 includes a fluid conduit 30 extending upwardly from the second valve assembly 18 and configured to be in fluid communication therewith. The watering fountain 10 includes an activator rod 32 extending upwardly from the second valve assembly 18. The activator rod 32 is disposed within the fluid conduit 30 and is operationally coupled to the second valve assembly 18. The activator rod 32 is configured to depress a diaphragm actuator 40 disposed within the second valve assembly 18. The diaphragm actuator 40 is configured to activate the release of fluid from the pressurized water supply 14 by manipulating a diaphragm 38 within the second valve assembly 18 and allowing water to travel up through the first valve assembly 12 through the second valve assembly 18, and up through the fluid conduit 30 to a basin of the watering fountain 10. The second valve assembly 18 includes a biased member 25 configured to adjust the diaphragm actuator 40 and the activator rod 32 back to a original position and ready to depress and release fluid upon activation. The biased member 25 is substantially about a top portion of the diaphragm actuator 40.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate particular couplings and valve structures, other couplings and valve structures are contemplated and intended to be within the scope of the claims except and only to the degree such is specifically limited otherwise.

Additionally, although the figures illustrate an assembled fountain disposed within the ground, it is contemplated that such a system may be sold as a kit of unassembled and/or uninstalled parts intended and/or including instructions for assembly in a manner that substantially creates the fountain described and/or claimed herein.

Finally, it is also envisioned that the parts of the fountain may be made of a variety of materials including but not limited to plastics, metals, rubbers, polymers, fibers, minerals, glass, ceramics, composites, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A watering fountain, comprising:
   a) a first valve assembly coupled to a pressurized water supply, including a check valve configured to restrict water flow under pressurized water conditions;
   b) a second valve assembly selectably coupleable to the first valve assembly and including:
      b1) a disabling structure shaped and positioned such that when the second valve assembly is coupled to the first valve assembly, the disabling structure disables the check valve of the first valve assembly, thereby permitting fluid to flow therethrough, under pressurized water conditions;
      b2) a diaphragm valve configured to bilaterally restrict fluid flow in a first mode, and permit fluid flow in a second mode; and
      b3) a drain port disposed above the diaphragm valve and configured to permit fluid to drain therefrom;
   c) a fluid conduit extending upwardly from the second valve assembly;
   d) an activator rod extending upwardly from the second valve assembly inside the fluid conduit and operationally coupled to the diaphragm valve;
   e) a basin extending upwardly from the fluid conduit and in fluid communication therewith; and
   f) an activator plate operationally coupled to the activator rod and disposed within the basin.

2. The fountain of claim 1, wherein displacement of the activator plate releases fluid to the basin.

3. The fountain of claim 1, wherein the second valve further comprises a flexible diaphragm disposed within the diaphragm valve and configured to restrict or release fluid there through.

4. The fountain of claim 3, wherein the second valve further comprises a diaphragm actuator disposed within the second valve and configured to actuate the flexible diaphragm to restrict and release fluid there through.

5. The fountain of claim 1, wherein the activator plate is substantially circular.

6. The fountain of claim 1, wherein the second valve further comprises a quick connect valve coupled to the fluid conduit and configured to quickly disconnect therefrom.

7. The fountain of claim 1, wherein the activator plate is disposed within the basin and configured to rest perpendicularly to a side wall of the basin.

8. A watering fountain, comprising:
 a) a first valve assembly coupled to a pressurized water supply, including a check valve configured to restrict water flow under pressurized water conditions;
 b) a second valve assembly selectably coupleable to the first valve assembly and including:
  b1) a disabling structure shaped and positioned such that when the second valve assembly is coupled to the first valve assembly, the disabling structure disables the check valve of the first valve assembly, thereby permitting fluid to flow therethrough, under pressurized water conditions;
  b2) a valve configured to bilaterally restrict fluid flow in a first mode, and permit fluid flow in a second mode; and
  b3) a drain port disposed above the diaphragm valve and configured to permit fluid to drain therefrom;
 c) a fluid conduit extending upwardly from the second valve assembly;
 d) an activator rod extending upwardly from the second valve assembly inside the fluid conduit and operationally coupled to the valve;
 e) a basin extending upwardly from the fluid conduit and in fluid communication therewith; and
 f) an activator plate operationally coupled to the activator rod and disposed within the basin.

9. The fountain of claim 8, wherein displacement of the activator plate releases fluid to the basin.

10. The fountain of claim 9, wherein the second valve further comprises a flexible diaphragm disposed within the valve and configured to restrict or release fluid there through.

11. The fountain of claim 10, wherein the second valve further comprises a diaphragm actuator disposed within the second valve and configured to actuate the flexible diaphragm to restrict and release fluid there through.

12. The fountain of claim 11, wherein the activator plate is substantially circular.

13. The fountain of claim 12, wherein the second valve further comprises a quick connect valve coupled to the fluid conduit and configured to quickly disconnect the fluid conduit therefrom.

14. The fountain of claim 13, wherein the activator plate is disposed within the basin and configured to rest perpendicularly to a side wall of the basin.

15. A watering fountain, comprising:
 a) a first valve assembly coupled to a pressurized water supply, including a check valve configured to restrict water flow under pressurized water conditions;
 b) a second valve assembly selectably coupleable to the first valve assembly and including:
  b1) a disabling structure shaped and positioned such that when the second valve assembly is coupled to the first valve assembly, the disabling structure disables the check valve of the first valve assembly, thereby permitting fluid to flow therethrough, under pressurized water conditions;
  b2) a valve configured to bilaterally restrict fluid flow in a first mode, and permit fluid flow in a second mode;
  b3) a drain port disposed above the diaphragm valve and configured to permit fluid to drain therefrom;
  b4) a flexible diaphragm disposed within the valve and configured to restrict or release fluid there through;
  b5) a diaphragm actuator disposed within the second valve and configured to actuate the flexible diaphragm to restrict and release fluid there through; and
  b6) a quick connect valve coupled to the fluid conduit and configured to quickly disconnect the fluid conduit therefrom;
 c) a fluid conduit extending upwardly from the second valve assembly;
 d) an activator rod extending upwardly from the second valve assembly inside the fluid conduit and operationally coupled to the valve;
 e) a basin extending upwardly from the fluid conduit and in fluid communication therewith; and
 f) an activator plate operationally coupled to the activator rod and disposed within the basin; wherein displacement of the activator plate releases fluid to the basin; wherein the activator plate is substantially circular; wherein the activator plate is disposed within the basin and configured to rest perpendicularly to a side wall of the basin.

* * * * *